United States Patent [19]

Keener et al.

[11] 4,310,770

[45] Jan. 12, 1982

[54] DEMAND LOAD CONTROL

[75] Inventors: Harold M. Keener, Ashland; Michael J. Sciarini, Dover, both of Ohio

[73] Assignee: Ohio Agricultural Research and Development Center, Wooster, Ohio

[21] Appl. No.: 212,455

[22] Filed: Dec. 3, 1980

[63] Continuation-in-part of Ser. No. 060,289, July 25, 1979, abandoned.

[51] Int. Cl.³ .............................................. G05B 6/02
[52] U.S. Cl. ........................................ 307/35; 307/39
[58] Field of Search ................... 307/31, 35, 38, 39, 307/41, 126; 364/493

[56] References Cited

U.S. PATENT DOCUMENTS

| | | | |
|---|---|---|---|
| 2,627,013 | 1/1953 | McCabe | 219/20 |
| 2,784,322 | 3/1957 | Johnson | 307/39 |
| 3,296,452 | 1/1967 | Williams | 307/62 |
| 3,469,153 | 9/1969 | Appelo | 361/169 |
| 3,538,391 | 11/1970 | Bensley et al. | 361/166 |
| 3,540,030 | 11/1970 | Hartz | 340/310 |
| 3,714,453 | 1/1973 | Delisle et al. | 307/39 |
| 3,723,753 | 3/1973 | Davis | 307/41 |
| 3,901,308 | 8/1975 | Berger | 307/39 |
| 3,925,680 | 12/1975 | Dixon | 307/39 |
| 3,984,699 | 10/1976 | Bailey | 307/41 |
| 4,010,412 | 3/1977 | Forman | 307/39 |
| 4,020,358 | 4/1977 | Wyland | 307/39 |
| 4,024,411 | 5/1977 | Bengoa | 307/41 |
| 4,027,171 | 5/1977 | Browder et al. | 307/39 |

OTHER PUBLICATIONS

D. M. Yore, "A Guide to Demand Control", Scientific Columbus, Inc., Columbus, Ohio 43212.

*Primary Examiner*—L. T. Hix
*Assistant Examiner*—James L. Dwyer
*Attorney, Agent, or Firm*—Millard and Cox

[57] ABSTRACT

System, method and apparatus for carrying out the shedding of electrical loads on a predetermined priority basis. A sensor network (32) detects a demand load at a power input (10) and develops a signal representative thereof. This signal is introduced to a series of controllers (36-39) along with a signal from an allowable load control circuit (48) which represents a predetermined maximum allowable load value. The controllers respond when the demand load is higher than the allowable load, a priority delay network (108) in each having a time-out interval corresponding with the relative priority basis assigned each load. Simultaneously, with the shedding of a load at the termination of the priority delay, a fictitious load feedback signal (102) is summed (96) with the demand load signal of the sensor. A reset control (90) responds in conjunction with a predetermined review interval timing function (144) to re-evaluate the priorities of shed loads in the event of a drop in demand load.

18 Claims, 8 Drawing Figures

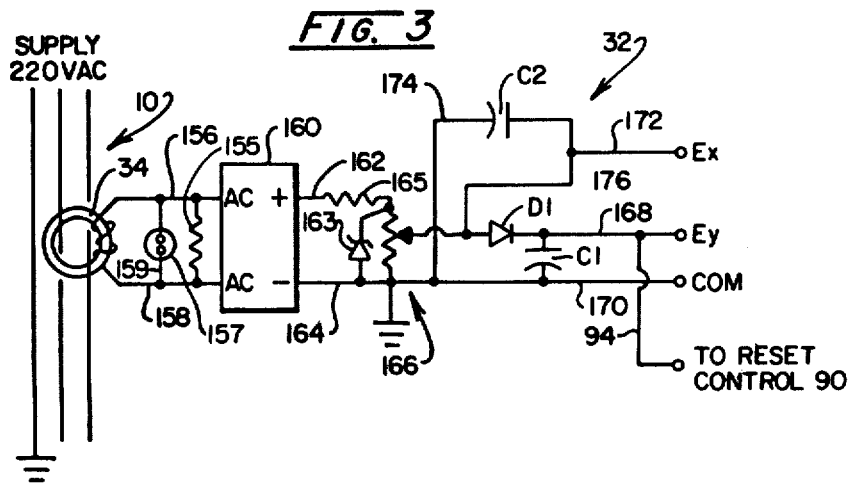
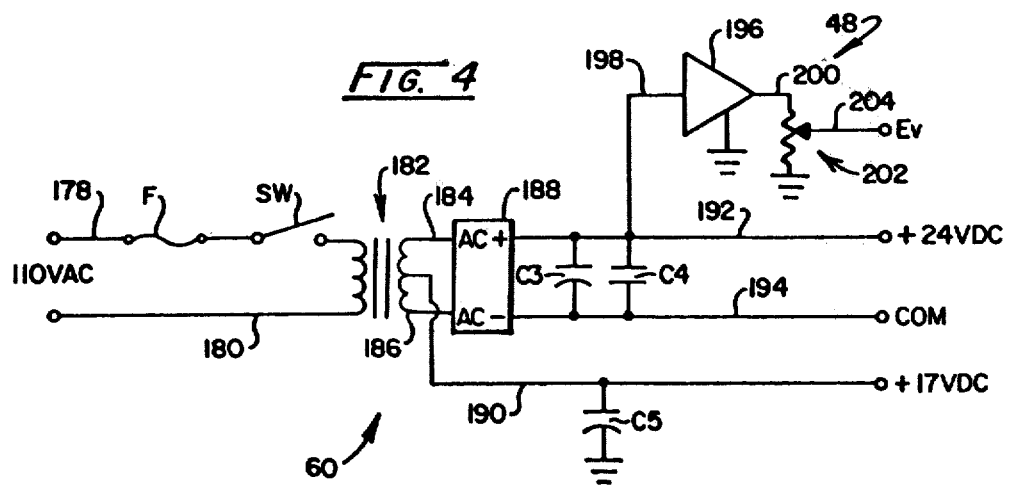

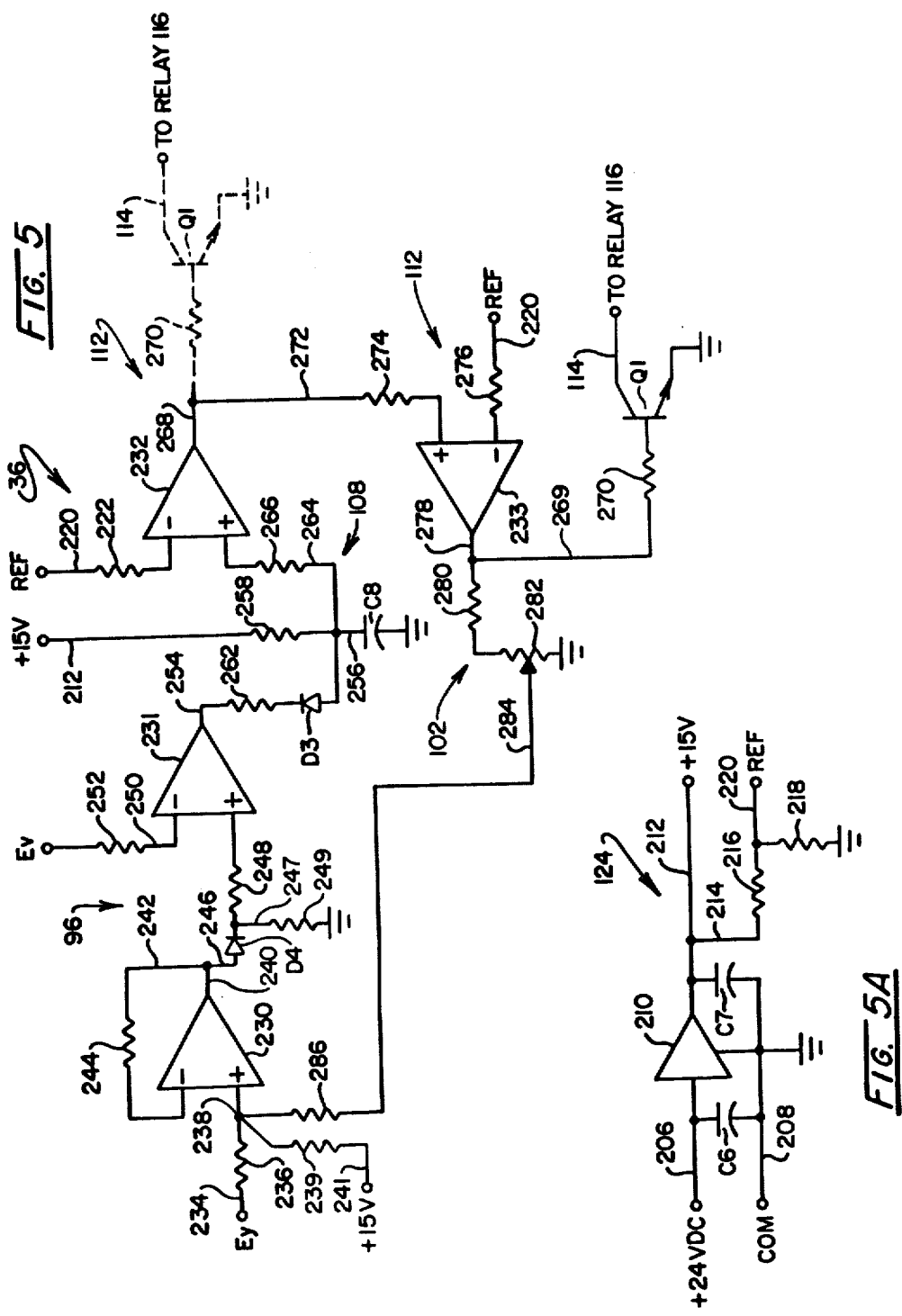

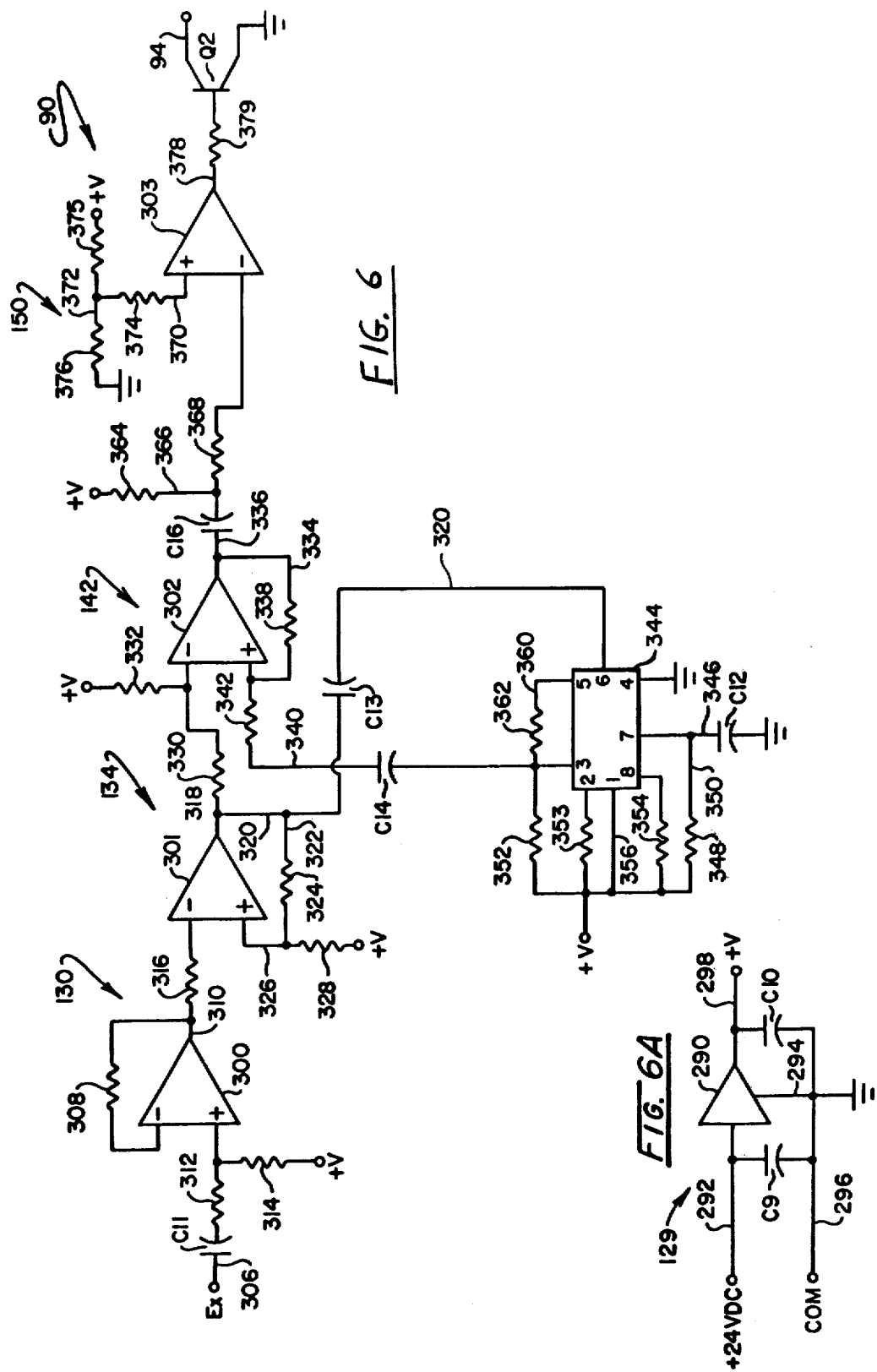

DEMAND LOAD CONTROL

This application is a continuation-in-part of our application Ser. No. 060,289, filed July 25, 1979, now abandoned.

BACKGROUND OF THE INVENTION

Electric utility companies have long been confronted with a requirement for providing excess generating capacity in order to accommodate peak loading periods. These periods occur for a variety of reasons related to home appliance use or industrial requirements. For example, widespread use of air-conditioning occurs on hot days, while heating related loads occur during winter periods. Industrial utilization, for the most part, occurs during specific working hours and all such concentrations of use combine to develop demand peak periods.

To recoupe the costs associated with the additional generating capacity required, utility companies have resorted to a variety of billing structure approaches related to peak period power use. One such approach, sometimes referred to as "billing demand", elevates the rate structure to penalize a consumer whenever the demand load of a user exceeds a predetermined maximum value. Monitoring for such billing is carried out by demand meters which provide a billing output reflecting both higher and lower demand load rates.

Industry, in particular, has turned to the use of load monitoring and shedding schemes to control the higher energy costs resulting from peak demands. The techniques for carrying out such control usually are somewhat involved, microprocessors and the like often being utilized to provide a programmed priority control of load shedding. For the home or farm environment, however, a flexible, relatively low cost load shedding approach is required. To find acceptance in such non-industrialmarkets, the load shedding approach should permit the consumer to select those loads or appliances which are to be controlled and assign a use priority to them such that more important appliances will be shut down the least. In a farm environment, water heaters, for example associated with milking facilities will have a lower priority, while milking operation equipment will be assigned a very high priority. Conversely, feeding operation equipment including silo loaders, elevators or augers would be assigned a lower priority. In the home, such implements as water heaters and clothes dryers would be assigned a lower priority, while electric stoves would be assigned higher priority. Similarly, baseboard heaters could be arranged with priorities related to their location. Another desirable attribute for such a control arrangement will be concerned with the reinstatement of a load. For example, should a load which has been shed have a relatively low incremental value with respect to the total maximum demand, upon the lowering of total loads to an extent permitting this smaller load to return, the system should so react. However, when a drop in the total load is such that a higher priority load can be reinstated, then the low priority load should be held off while higher priority loadings are returned to service.

SUMMARY OF THE INVENTION

The present invention is addressed to an improved system, apparatus and method for shedding electrical loads under a priority basis, as well as for reinstating those loads in an efficient manner. The system of the invention, while providing highly desirable shedding and reinstatement logic, remains fabricable at moderate costs commensurate with its utilization within a home or farm environment. With the system, individual, relatively low cost modular controllers are provided for each load desired to be controlled and each controller is simply adjusted by the user to reflect the priority basis of its associated load. This adjustment is one wherein a time delay interval is selected delaying load shedding activity, the duration of the delay being directly related to the relative priority of the load, lower periods of delay being selected for loads of lower priority. Commencement of these time delay periods occurs with the sensing of a demand load at the power input to the home or farm which exceeds a predetermined maximum allowable load value. Following an initial shedding of a load, a reset control circuit is activated to commence a time-out over an interval corresponding at least with the greatest of all of the load priority delay intervals and, with the occurrence of a sensed drop in demand load, will reinstate all loads to permit the system to again evaluate the loadings on a priority basis.

Another feature and object of the invention is to provide a system for selectively shedding electrical loads from a power input in accordance with a predetermined priority basis at such times as when the demand load value exhibited at that power input exceeds an allowable load value. A sensor is provided which is positioned adjacent the power input to the home or farm which has an output signal of instantaneous value corresponding with the demand load value. A load control arrangement is provided for establishing an allowable load signal having a value corresponding with the predetermined allowable load value. The system further incorporates a plurality of load switching units each connectable with a different load and each comprising a controller and a switch; each of the controllers has a receiving network, a priority delay network deriving an actuating output condition when enabled and following a priority interval selected in correspondence with the predetermined priority basis of its associated load. Each controller further incorporates an actuator network which is responsive to the actuating output condition of the priority delay network and serves to derive a shedding signal. Each receiving network has a first input for receiving the sensor output signal and a second input for receiving the allowable load signal. It then derives an output condition which enables the priority delay network when the signal value at the initial input is greater than the signal value at the second. Furthermore, each controller has a feedback circuit responsive to the shedding signal for deriving a fictitious load signal of value substantially corresponding to its associated load and asserting this fictitious load signal at the first input of the receiving network of that controller but not at the first input of the receiving network of any other controller. Each switch is connectable with its associated load and with the power input and responds to the shedding signal supplied by its associated controller for disconnecting its associated load from the power input. To establish the proper fictitious load signal, the operator need merely dial in a load wattage value corresponding with the corresponding characteristic of the load being controlled. Each of the controllers also incorporates a power supply regulator and filter which assures that no cross talk will occur between the several controllers which are used in a given installation.

As another object and feature, the system of the invention incorporates a reset control which incorporates an input circuit responding to the output signal of the sensor when that signal represents a diminution of the demand load value and, in consequence, derives a review actuating signal. A review interval timing circuit is provided which responds to the review actuating signal to derive a review interval timing signal at the termination of a predetermined review interval. This review actuating signal activates a condition responsive network to derive an enabling condition. The condition responsive network is also responsive to the review interval timing signal in the presence of the noted enabling condition for deriving at the output of the circuit, a transient reset condition for effecting a re-evaluation of the demand load value in accordance with the controller priority intervals earlier established.

As another feature and object, a method is provided for selectively shedding electrical loads from a power input in accordance with a predetermined priority basis. The method incorporates the steps of sensing the instantaneous demand load value exhibited at that power input and providing a demand load signal which corresponds with it. This demand load signal then is compared with a signal representing a predetermined allowable demand load and time delay intervals are initiated with respect to each load under a first condition in which the demand load signal is greater than the allowable demand load value, each of the delay intervals associated with a load having a duration directly related to the priority basis established for the loads. Each load associated with a time delay interval is shed at the termination of that interval in the continued presence of the first condition and, simultaneously, a fictitious load signal corresponding with the shedded load is summed with the demand load signal. If at any time following shedding a condition occurs where the demand signal plus fictitious load signal is less than the allowable demand load value, then that load will be reinstated. In addition all of the loads are returned or reinstated to the power input folllowing an interval of predetermined duration and in the presence of a second condition wherein the demand load signal drops in value.

The invention, accordingly, comprises the system, apparatus and method possessing the features, technique and properties which are exemplified in the description to follow hereinafter and the scope of the invention is indicated in the appended claims.

BRIEF DESCRIPTION OF THE DRAWINGS

FIG. 3 is a circuit diagram of a sensor network of the invention;

FIG. 4 is a diagram of a principal power supply of the system of the invention;

FIG. 5 is a circuit diagram of a controller circuit of the invention;

FIG. 5A is a circuit diagram of a regulator utilized in conjunction with the circuit of FIG. 5;

FIG. 6 is a circuit diagram of a reset network of the invention; and

FIG. 6A is a circuit diagram of a regulator used in conjunction with the circuit of FIG. 6.

DETAILED DESCRIPTION OF THE INVENTION

Figure 1:
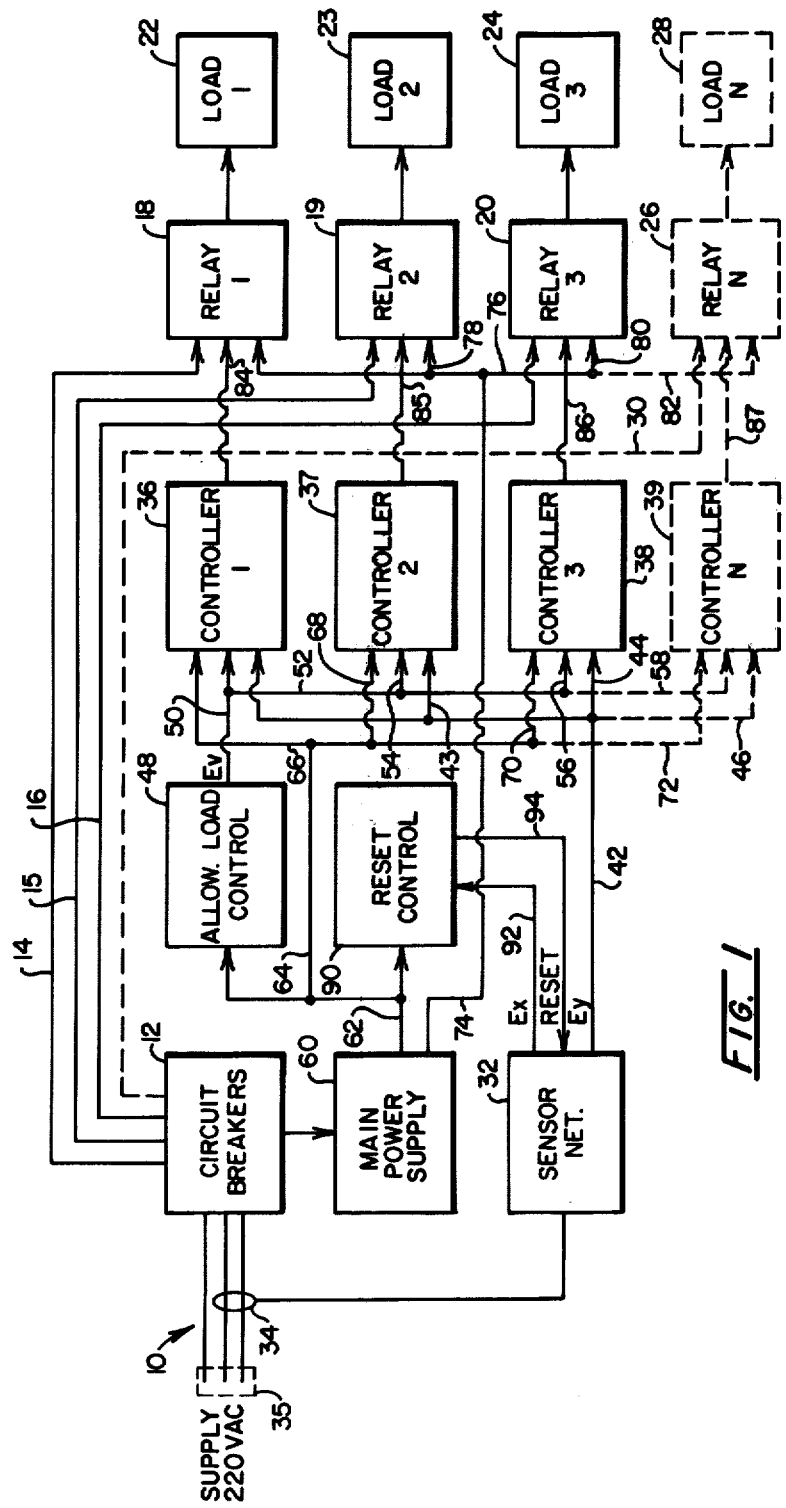
FIG. 1 is a block schematic diagram of the system of the invention showing its inter-relationship with loads for power supply inputs and circuit breakers.

Referring to FIG. 1, a block schematic diagram of the system of the invention as it would be installed in a farm or home environment is set forth. A typical supply, for example, 220 volts a.c. is shown as a three wire power input 10. This input is directed in conventional fashion to an array of circuit breakers represented at block 12. Circuits extending from the circuit breaker array 12 are represented by lines 14–16 as leading to respective relays at blocks 18–20. From relays 18–20, also respectively identified as relays 1–3, power is selectively applied to loads 1–3, as represented respectively by blocks 22–24. The number of relays utilized or loads selected for shedding control may vary to suit the needs of the user, final a relay, N, being shown in phantom at 26 serving to control a load 28 and being associated with the circuit breaker function 12 by line 30. Of course, several relays and associated loads may be coupled within a single circuit extending from circuit breaker array 12. Relays 1-N, serve the function of selectively switching on or off corresponding loads 1-N and may be electromagnetically actuated in conventional fashion. Of course, solid state switching techniques may be utilized.

The instantaneous demand load is continuously monitored at power input 10 by a sensor network represented at block 32 which operates in conjunction with a ring shaped core and toroidal winding schematically represented at 34. Such transformer like devices are readily available in the marketplace, for example, certain are manufactured as a model 6CT 11-B by Midwest Electric Products, Inc. Mankanto, Minn. As represented in phantom at block 35, an auxiliary circuit breaker may be interposed within power input 10 for the isolation of any faults which may occur through the use of sensor 34. Sensor network 32 responds to the voltage signal generated by sensor 34 and serves to rectify, calibrate and filter the signal to develop an output signal $E_y$ which is directed to one input of each of a series of controller modules 1-N as represented at blocks 36–39. Each of the controllers 36–39 is connected to one of the relays 1-N; each associated pair of controller and relay forms a load switching unit controlling the operation of a single load. Connection between sensor network 32 and the controllers 36–39 is represented, respectively, at lines 42–44 and dashed line 46. A second input to controllers 36–39 is derived from an allowable load control function represented at block 48 which serves to generate a signal at its output line 50, $E_v$, which represents the predetermined maximum allowable load valuation selected by the operator. This selection will be seen to be carried out by manual manipulation of a potentiometer.

Line 50 extends to controller 36 and the signal, $E_v$ is presented along lines 52 and 54 to controller block 37, from lines 52 and 56; to controller 3 at block 38; and through lines 52 and dashed line 58 to controller N, represented at block 39. Power is supplied to allowable load control function 48 as well as controllers 36–39 from a main power supply represented at block 60 which derives its power input from the array of circuit breakers at block 12. The power output from supply 60 is provided through line 62 to allowable load control 48, and through lines 62, 64 and 66 to controller 1 at block 36; through lines 66 and 68 to controller 2 at block 37; through lines 66 and 70 to controller 3 at block 38; and through lines 66 and dashed line 72 to controller N at block 39. Power supply 60 also provides a power output to relays 1-N from along line 74 which is coupled, in turn, to lines 76, 78, 80 and 82. The latter line grouping will be seen to be directed to the inputs of these relays. Each of the controllers 1-N serves to control one discrete predetermined load through its associated relay 1-N and operates to compare the maximum allowable load, $E_y$ with the demand load, $E_{y'}$. In the event the signal at the demand load input is greater than the allowable load control signal, $E_y$ an output condition is developed which enables a priority delay network which, following a predetermined delay interval and the continuance of the input condition, activates an associated relay as at blocks 18-20 and 26. The coupling between controller function blocks 37-39 and relays 18-20 and 26 is represented, respectively, at lines 84-87. In accordance with the invention, the period of delay within each controller is correlated with the priority basis of a given load. Desirably, at least some of the controllers are provided with a manually-operable adjustment means for adjusting their priority intervals. In this regard, the higher the priority of the load, the longer the delay selected for the timing circuit of the controllers. Thus, when the controllers at blocks 36-39 react to a demand load condition, the first controller to react to activate its associated relay and uncouple an associated load is that with the shortest time delay interval. To prevent the controllers from cycling back to an activated load condition once they drop out a load, a feedback arrangement is incorporated within each wherein a fictional load value signal is asserted at their input also receiving the sensor network 32 signal $E_{y'}$. These signals are summed and the load shedding condition is maintained thereby. This feature also will be seen to permit the return of a lesser load of lower priority during a predetermined reset or review interval to permit utilization of that lower level load even though a higher priority load is at that time uncoupled from the power supply.

The above-noted reset or review interval is derived from a reset control circuit which is represented generally at block 90. In effect, the system provides for establishing priorities but allows loads of lower priority to be returned to the power supply as long as maximum allowable load demand is not exceeded and an adequate load drop occurs within a given time envelope. Control circuit 90 is activated by the sensor network output signal as selectively filtered and identified as, $E_x$ as submitted from line 92. Conversely, following appropriate time-out of the function 90, a transient reset condition is provided as indicated along line 94 to the sensor network to cause the system to reset and commence realigning the load shedding structure in accordance with the predetermined priority basis.

Figure 2:
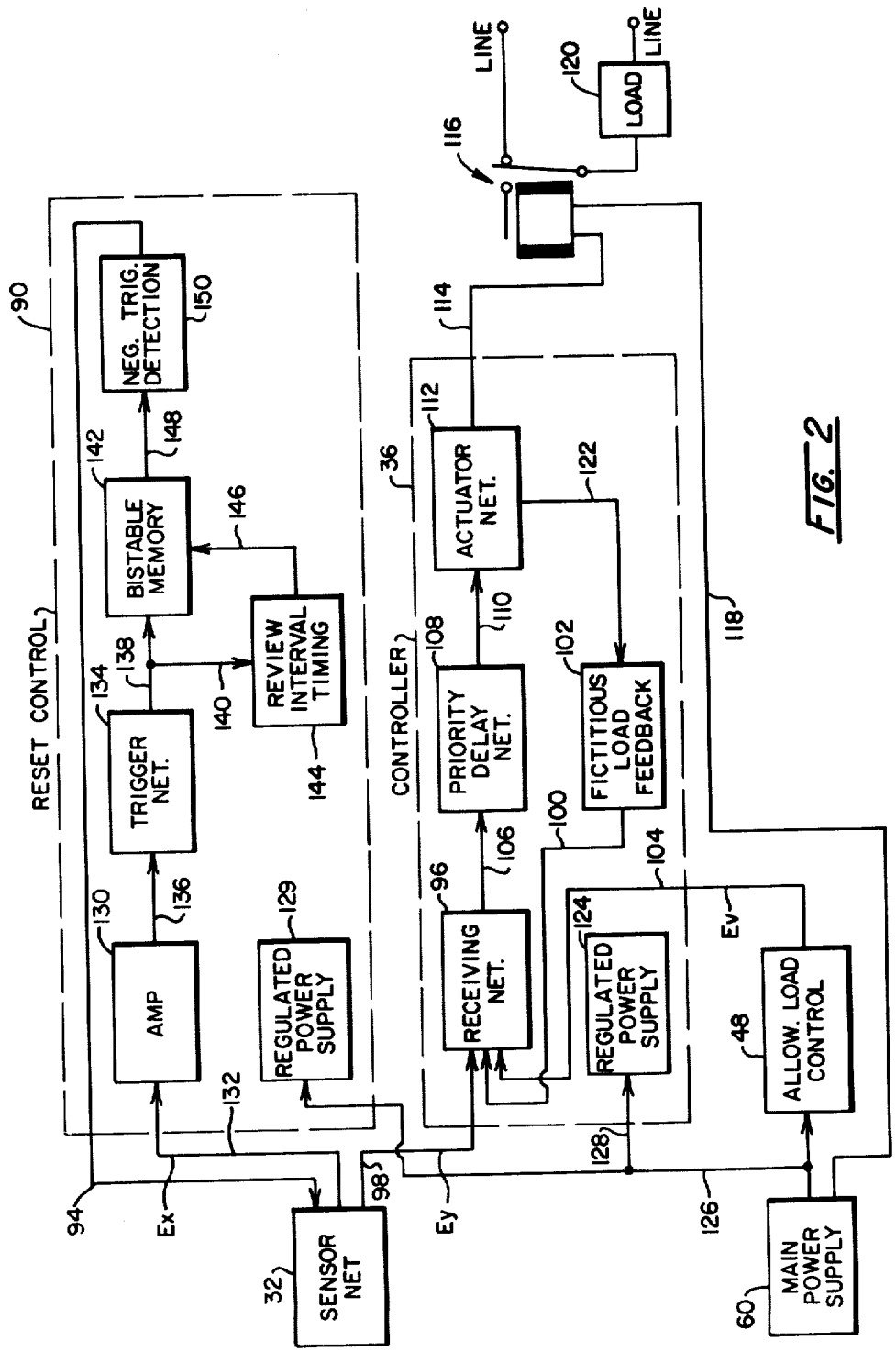
FIG. 2 is a block schematic diagram of the system of the invention, showing in more detail the inter-relationship of components within particular functions thereof.

Looking to FIG. 2, the components making up the controllers 36-39 as well as reset control 48 are revealed in a next higher level of detail. In the figure, sensor network function block 32, main power supply block 60 and allowable load control function block 48 are reproduced, while the components of a given controller as described at 36-39 are shown in block schematic fashion within a labeled dashed boundary 36. Each of the controller units is modular in construction so that the user may provide one such modular component for each load over which a shedding control is desired. Within controller boundary 36 there is shown a receiving network 96. This network contains a summing input which receives the sensor network signal along line 98 which may be summed with a fictitious load feedback signal at line 100 emanating from a fictitious load feedback 102. The third input to the receiving network 96 is derived from the allowable load control 48 along a line 104. The receiving network 96 serves initially to compare the sensor network output signal representing demand load value, $E_y$ with the allowable load, $E_{y'}$. Where the latter value is lower than the former, an output condition is developed enables a priority delay network 108 along a line 106. The delay asserted at the network 108 is that selected by the user to correspond with the relative priority basis of the load being controlled, a longer delay period being selected for a higher priority load. Following time-out, which occurs under the condition that the sensed output signal, $E_y$, at line 98 does not drop below the maximum allowable load signal, $E_{y'}$, at line 104 before the conclusion of the delay time out, an actuating output condition will be present at line 110 and witnessed by an actuator network 112. Network 112, in turn, derives a shedding signal which acts to disconnect a given load, for example by providing a signal along line 114 to a relay now represented at 116. Relay 116 corresponds with those described in connection with FIG. 1 at 18-20 and 26 and is provided having normally closed contacts. Upon being energized, for example from main power supply 60 through lines 118 and 114, the normally closed contacts are opened to remove the power input to an associated load as described at 22-24 and 28 in FIG. 1 and now represented at 120. Actuator network 112 also asserts the shedding signal along line 122 to fictitious load feedback 102 to actuate it. Feedback 102 is adjusted by a potentiometer or the like such that the signal asserted at line 100 is equivalent to the power required at load 120. This signal, and the sensor network output signal, $E_y$, is inserted and summed at receiving network 96 to maintain load 120 in an uncoupled status. The summed signal at the input to receiving network 96 is selected of slightly elevated value to provide about a 1 percent dead band arrangement to prevent chatter and like phenomena. Additionally positioned within boundary 90 is a regulator or regulated power supply 124. Outputs from this block serve to power the various components of the controller and the regulator function provides an isolation from other controller modules to assure quality performance of the system. Power supply 124 is shown receiving input power from main power supply 60 through lines 126 and 128.

The reset control 90 in FIG. 1 is again represented at 90 within a dashed boundary in FIG. 2. Similar to controller 36, reset control 90 includes a regulated power supply 129 which is shown coupled with main power supply 60 by line 126. The control 90 responds to a treated or filtered output signal of sensor network 32 as presented to an amplification stage 130 through line 132. Stage 130 appropriately amplifies the signal and presents it to the input of a trigger network 134 along a line 136. Responding only to a negative going signal representing a drop in total load or demand load value, network 134 provides an a review actuating signal output on lines 138 and 140. The output on line 138 conditions a bi-stable memory network 142 and provides a load drop triggering signal to a review interval timing function 144. The interval selected for timing at function 144 is one generally at least representing the maximum of all priority timing derived by the priority delay networks 108. And, following such time-out of this interval, a review interval timing signal is derived at line 146 which is directed to condition responsive components including memory 142 to change its output state at line 148. This change, upon a subsequent occurrence of a corresponding drop in demand, is detected at negative going triggering detection 150 which asserts a resetting signal along line 94 as a transient reset condition to sensor network 32. This causes the system to recycle, permitting the reinsertion of uncoupled priority loads and the like in accordance with the extent of demand load drop then available.

Now, turning to the circuit diagrams corresponding with the functional components described in connection with FIGS. 1 and 2, reference is made to FIG. 3 wherein the sensor network 32 is illustrated. Sensor 34 is shown having its toroidal winding coupled through lines 156 and 158 to a conventional bridge rectifier 160. A resistor bridges the lines 156 and 158 produce a voltage signal linearly related to the current. To provide protection from voltage surge phenomena, a limiting resistor 165 is inserted within line 162 which performs in conjunction with a zener diode 163, the latter being coupled across the winding of potentiometer 166. Rectifier 160, in typical fashion, provides a pulsating d.c. output at lines 162 and 164 which is calibrated at a potentiometer 166. In the interest of providing system protection from lightning and other various transient phenomena, a neon (gaseous discharge) tube 157 may be provided as coupled intermediate lines 156 and 158 by a line 159. The signal from potentiometer 166 is directed through two filter networks, the initial one including the wiper arm of potentiometer 166, a diode D1 and a capacitor C1. Diode D1 is coupled within line 168 and capacitor C1 is coupled between line 168 and common lead 170. The resultant filtered output on line 168 is the sensor output signal, $E_y$ having an instantaneous value corresponding with demand load value. The line 94 (see also FIGS. 1 and 2) leads from the line 168 to the reset control 90 as described in more detail below. Alternatively, the line 94 could be connected to the line between the wiper arm of potentiometer 166 and the diode $D_1$, but it is preferred to connect the line 94 to the line 168 since this ensures the capacitor $C_1$ is fully discharged when the reset command is sent to the reset control 90, as described below. The second filter provided for the output of potentiometer 166 incorporates line 176 and capacitor C2. Capacitor C2 is coupled between line 170 and output line 172 by line 174. The output on line 172 is the second sensor output $E_x$. The capacitance value of capacitor C2 is smaller than that of capacitor C1 and provides a more rapid signal response to a drop in load value witnessed at power input 10 by sensing device 34. This is provided inasmuch as the reset control function 90 responds to a drop in demand load as opposed to an increase. Diode D1 is an isolation diode serving to eliminate any possibility of cross talk between the filters deriving signals $E_x$ and $E_y$.

Referring to FIG. 4, the main power supply 60 includes input lines 178 and 180 which are coupled to a conventional, 110 v household outlet. Line 178 incorporates a fuse, F, and a switch, SW, and leads, along with line 180, to one side of a center-tapped transformer 182. The output of transformer 182 at lines 184 and 186 leads to corresponding inputs of a bridge rectifier 188 and the output winding is tapped by line 190 to provide a drive utilized for the relays 18–20 and 26 as described above.

The output of bridge rectifier 188 is present at lines 192 and 194, the latter representing a common which is coupled, inter alia, with line 170 in FIG. 3. Capacitors C3 and C4 are connected between lines 192 and 194 and serve a conventional filtering function. A capacitor C5 is coupled between line 190 and ground.

FIG. 4 also shows the allowable load control 48. Network 48 includes a voltage regulator 196 having an input coupled to line 190 through line 198. Regulator 196 may be of any conventional variety, for instance, Type LM78L15 marketed by National Semiconductor Corp. Santa Clara, Cal., and provides a regulated output at line 200 which extends to a manually-adjustable set point potentiometer 202 coupled between line 200 and ground and having a wiper arm coupled with output line 204. By adjusting potentiometer 202, the signal at line 204 represents that value selected as the allowable load signal, $E_r$. The signal $E_r$ is introduced, as described earlier herein, to one input of the receiving network 96 of each of the controller modules 36–39.

Looking to FIGS. 5 and 5A, a circuit diagram for each of the controllers shown is represented in detail. FIG. 5A shows the regulated power supply 124 which serves to isolate the modules one from another to assure that no spurious noise or cross talk is generated. The inputs to regulator 124 are provided at lines 206 and 208, line 206 extending to the input of a voltage regulator 210 which may be of the earlier described type LM78L15. The output of regulator 210 is present on line 212 and is connected to line 208 in conjunction with conventional filtering capacitors C6 and C7. An additional line 214 is coupled to output line 212 and incorporates a voltage divider network including resistors 216 and 218 to provide a reference output on line 220.

As shown in FIG. 5, the controller 36 includes a quad packaged grouping of operational amplifiers or stages 230–233 which may be of a type marketed as Model No. LM3900 by National Semiconductor Corp. (supra). These stages are connected to carry out a variety of functions, the initial ones being that of the receiving network 96. Receiving network 96 includes a first input at line 234 which is coupled with output line 168 of the sensor network 32 and receives the signal $E_y$. Line 234 incorporates a summing resistor 236 and is coupled through a summing point 238 to one input of stage 230 which is configured as a summer. Summing point 238 is also connected via a line 241 incorporating a resistor 239 to a logical high (+15 v) supply provided from line 212 in FIG. 5A. In this regard, the output of the stage 230 on line 240 is coupled with a feedback line 242 incorporating a variable feedback resistor 244. Variation of the resistor 244 allows for calibration of the module 36 by varying the gain of the stage 230. Line 240, incorporating a diode D4 and an input resistor 248, in turn, is coupled to line 246 which, is connected to one input of stage 231 which is coupled as a comparator. From a point between the diode D4 and the resistor 248, a line 247 runs to ground via a resistor 249. The provision of the logical high (+15 v) to the summing point 238, the diode D4, the ground line 247 and the variable resistor 244 allows for proper adjustment of the output from stage 230 with a low value input signal. Alternatively, the lines 241 and 247, the resistors 239 and 249 and the diode D4 may be omitted and the resistor 244 may be fixed at a value which will produce unity gain in the stage 230; however, this may lead to some difficulty in securing the correct output from stage 230 and hence the circuitry shown in FIG. 5 is preferred.

The other input to stage 231 is provided on line 250 which is coupled through a input resistor 252 to the maximum allowable load signal, $E_v$, derived from line 204 as described in conjunction with FIG. 4. With the arrangement shown, under circumstances wherein the signal $E_y$ exceeds the signal $E_v$, the output of the stage 231 on line 254 will revert from a zero to a plus supply voltage level to thus derive an output condition enabling the priority delay network 108. Network 108 includes an R.C. timing network including timing capacitor C8 coupled between line 256 between ground and line 212 which incorporates a variable timing resistor 258. The common junction between lines 256 and 212 is coupled with output line 254 which, additionally, incorporates an isolating diode D3 and decay controlling resistor 262. With the arrangement shown, when the signal $E_y$ is less than signal $E_v$, line 254 is at a logic low, and capacitor C8 remains low. However, as the value of signal $E_y$ increases above the value of signal $E_v$, line 254 achieves a logic high to back bias diode D3 and permit the time dependent charging of capacitor C8 in accordance with a predetermined time constant fixed by the values of the resistor 258 and the capacitor C8. This time constant is selected in accordance with the priority basis assigned to the particular load to which the controller module at hand is coupled. The longer the time constant, the higher the priority basis for that load as described earlier herein. Variation of the timing resistor 258 may be effected manually, thereby enabling the delay of the network 108 and thus the priority of the load 22 controlled by the module 36 to be varied. Alternatively, of course, the resistor 258 could be fixed and the capacitor C8 made variable. The junction of lines 256 and 212 at which point an actuating output condition is developed, additionally is coupled through line 264 to the input of actuator network 112. In this regard, line 264 includes input resistor 266 and is coupled to one input of stage 232 which is coupled within the circuit to function as a comparator. The opposite input to stage 232 is provided from line 220 which carries a reference voltage as developed in conjunction with the regulator at FIG. 5A and incorporates an input resistor 222. With the arrangement shown, when the input to stage 232 as developed from timing function 108 at 264 is greater than the value of the reference signal at line 220, then a logical high representing a shedding signal is developed at output line 268.

Stage 233 is coupled as a comparator having one input thereto at line 272 incorporating input resistor 274 and coupled to line 268. The opposite input to stage 233 is provided from line 220 carrying the reference voltage described in connection with FIG. 5A and including input resistor 276. Stage 233, while thus coupled as a comparator, performs functionally as a gate. Accordingly, with the presence of a logical high shedding signal at line 268, the output of stage 233 at line 278 becomes a logical high approaching supply voltage. The output on line 278 is supplied to a voltage divider network formed by a resistor 280 and the slide wire of a potentiometer 282, one end of which is coupled to ground. Potentiometer 282 performs a calibration function, the adjustment of its wiper arm being made to provide a signal on a line 284 connected thereto which corresponds to the wattage value of the load being controlled by the controller module. This fictitious load signal on line 284 is directed through summing resistor 286 to summing point 238.

The output of stage 233 on line 278 is also supplied via a line 269 incorporating a resistor 270 to the base of an NPN transistor Q1. The collector of transistor Q1 is connected to the line 114 supplying the relay 116 (see FIG. 2), while the emitter of transistor Q1 is connected to ground. Accordingly, when transistor Q1 is turned on, relay 116 disengages its load 120 (FIG. 2) from the power supply. If desired, protection of transistor Q1 from reverse voltage caused, for example, by an inductive surge may be achieved using a network comprising a capacitor and a diode connected in parallel across the relay coil.

As indicated in broken lines in FIG. 5, the line 269 may alternatively be connected to the junction of lines 268 and 272. However, with this arrangement, because the change in output from stage 233 is not instantaneous, the transistor Q1 causes the relay 116 to disconnect its associated load a short time (of the order of a few milliseconds) before the fictitious load signal is supplied along line 284 to stage 230. In certain circumstances this short interval between the disconnection of the load and the receipt by the stage 230 of the fictitoius load signal may lead to undesirable "chatter" (rapid, repeated switching on-and-off of the load associated with controller 36). To prevent such chatter, it is greatly preferred that the line 269 be connected to the line 278 so that the switching of the relay 116 and the receipt by the stage 230 of the fictitious load signal are simultaneous.

It should be noted that, when the line 269 is connected to the line 278, the stage 233 is part of the actuator network 112 (FIG. 2) since it is the output of stage 233 on line 278 which causes the relay 116 to shut off its associated load. In this case, the fictitious load feedback 102 (FIG. 2) comprises only the resistors 280 and 286, the potentiometer 282 and the line 284. However, when the line 269 is connected to the junction of lines 268 and 272, the stage 233 becomes functionally part of the fictitious load feedback 102.

In adjusting controller 36, if the load being controlled is a 10 kilowatt one, then the value adjusted through the wiper arm of potentiometer 282 is set to a voltage representing that value. As a consequence, when transistor Q1 responds to a shedding signal to activate its associated relay and drop a load from the circuit, a fictitious load is added to the input of the controller module. In consequence, the load will remain off pending a suitable reduction of the demand load value exhibited at the power input 10. As indicated earlier herein, several such controllers are provided in the system, being fabricated in modular fashion such that they may be plugged into the system with ease by the user.

Referring to FIGS. 6 and 6A, the reset control function 90 (FIGS. 1 and 2) as well as its associated power supply (129 in FIG. 2) are revealed in circuit diagrammatic fashion. The regulated power supply for the reset function is shown in FIG. 6A as including a regulator 290 having an input on line 292 which is coupled with main power supply output line 192 as described in conjunction with FIG. 4. Regulator 290 is coupled to common connection line 194 of the main power supply through lines 294 and 296. A filter capacitor, C9 is coupled between lines 292 and 296 as well as between line 296 and output line 298 of regulator 290. Regulator 290 may, for example, be of type LM78LO5 marketed by National Semiconductor Corp. (supra).

Looking to FIG. 6, the reset function is seen to include a quad packaging of four operational amplifier stages 300-303 which are connected within the system to carry out a variety of functions. These stages may be of the variety marketed as model LM3900 by National Semiconductor Corp. (supra). The signal introduced to the reset function on line 306 is that identified earlier as $E_x$ and developed on line 172 of the sensor network shown in FIG. 3. This signal is utilized when it is representative of a load drop and, as discussed earlier, is filtered such that the drop characteristic is emphasized. Signal, $E_x$ is coupled into the reset system at line 306 through coupling capacitor C11 and input resistor 312 to the positive input of amplification stage 300. Stage 300 has a gain of about 100 as established by feedback resistor 308 coupled between its output line 310 and its negative input. A resistor 314 also coupled to the positive input of stage 300 serves its a bias setting function. The output of amplification stage 300 corresponding with a negative going input signal is present as a negative going signal which is submitted through input resistor 316 to the negative input of stage 301. Stage 301 (block 134 in FIG. 2) is configured as a Schmitt trigger, the output thereof at line 318 being coupled via line 320, line 322, resistor 324 and line 326 to the positive input thereof. A bias resistor 328 present within line 326 is coupled to positive supply developed on line 298 as described in connection with FIG. 6A. The trigger configuration permits the development of a well defined pulse output at line 318 which may be described as a review actuating signal. This signal is a positive going one and is asserted through resistor 330 to the negative input of stage 302 of a condition responsive network. That input also is coupled to the supply developed on line 298 via an input resistor 332. Stage 302 operates as the bi-stable device denoted memory 142 in FIG. 2 and serves as a memory function. The bistable characteristic of stage 302 is developed by a feedback line 334 extending from its output on line 336 through resistor 338 to the positive input thereof. The input thereto is on line 340 which includes input resistor 342. Line 340 transmits the review interval timing signal output of the review interview timing (144 in FIG. 2). This timing function is actuated in the presence of review actuating signal present as the positive going pulse at line 318 extending from stage 301. The primary component of the timing 144 is a binary downcounting type timer 344 which may, for example, be of a type XR2242 marketed by Exar Integrated Systems, Inc., Sunnyvale, Calif. Timer 344 carries out a downcounting division by 128, each of the increments declinated having an interval established by an R-C timing network comprised of timing capacitor C12 within line 346 and timing resistor 348 within line 350. Pull-up resistors 352-354 are coupled with the pins or terminals of the device shown and to the supply developed on line 298 (FIG. 6A), while supply input to the device is provided through line 356. The triggering input to the timer 344 is developed as discussed above, through line 320, the positive going signal of which is coupled to the trigger input of the device. When so triggered, the output thereof at line 340 changes from a logical high to a logical low level until the completion of time-out. At that time, the output signal on line 340 changes to a logical high value which is directed through coupling capacitor C14 and input resistor 342 to the positive input of stage 302. To vary the time delay interval exhibited by timing function 144, resistor 348 or capacitor C12 may be variable.

Now, considering the operation of the bi-stable memory 142, in the event that the sensor network 32 signal, $E_y$, when compared with the load control allowable load signal, $E_v$, determines that a shedding sequence should be carried out, then a lowest priority controller module will develop a load shedding signal and, as a consequence, a negative going sensor signal, $E_x$, will be introduced to the associated reset control 90. Recall, that even though a fictitious load signal is developed by the controller module, this signal is introduced only at the summing point 238 as described at FIG. 5 and will have no effect on the signal, $E_x$. This negative going signal, $E_x$, is treated to develop a review actuating signal which is introduced to bistable stage 302 to cause it to assure a reset condition wherein its output at line 336 assumes a logical low or zero condition. Simultaneously, the review actuating signal is utilized to trigger review interval timing 144, timer 314 and a review timing interval is commenced. This time interval duration preferably will correspond at least with an interval representing the sum of all priority intervals of the controller modules. When a review interval timing signal is developed at line 340 and introduced to the positive terminal of stage 302, a resultant condition obtains at line 336 which changes from a logical 0 to logical 1. This will occasion a set condition of stage 302. Such set condition will continue until such time as another load drop occurs which will be represented at line 318 as a logic zero pulse. The latter input to stage 302 will be reflected at output line 336 as a negative transition to logic zero. Correspondingly, should time out not have occurred such that the set condition is not generated through the positive input of stage 302, then a pulse submitted from line 318 to the negative input of stage 302 will have no effect at output line 336.

Assuming stage 302 to be in a set condition and that a load drop representative pulse is introduced through line 318, the resultant negative going transition at line 336 is coupled through capacitor C16 to negative going trigger detection function 150 (FIG. 2). This function responds to reset the control modules and, in effect, the entire system.

The pulse duration of the above reset signal is determined by the values of the capacitor C16 and the resistor 364 within line 366. The thus treated reset signal is transmitted through input resistor 368 to the negative input of stage 303 which is within the earlier described negative going trigger detection function 150. Stage 303 is configured as a comparator, the positive input thereto being derived from lines 370 and 372 including resistors 374-376 arranged with respect to ground and supply voltage from line 298 (FIG. 6A) so as to form a divider network. This divider network provides for a predetermined fraction of supply voltage to be asserted at the positive input of stage 303, for example, 2/3 of that supply voltage value. The supply normally provides a logic zero output on line 378 which is connected via a resistor 379 to the base of an NPN transistor Q2. The emitter of transistor Q2 is connected to ground, while the collector thereof is connected to the line 94 extending from sensor network 32 (see FIG. 2). Normally, the logic zero signal on line 378 renders the transistor Q2 non-conductive but when a negative-going pulse is received from the line 336, the output on line 378 changes from logic zero to about $+V$ and back to logic zero. This causes the transistor Q2 to become conductive for a short time, so that line 94 is briefly grounded, for a period determined by the values of capacitor C16 and of resistor 364. This grounding of line 94 represents a transient reset condition, during which all of the controllers will see zero power since, as may be seen from FIG. 3, grounding line 94 reduces output $E_y$ to zero.

Assuming that a review actuating signal has been imposed through line 320 to timing function 144 and that an interval of time-out by that function is in progress, a load drop occurring during this interval will evoke no change in signal status at line 336 representing the output of stage 302. However, should that load drop be of sufficient magnitude, appliance loads which are of low enough value may be reinserted within the system. Returning to FIG. 5, the demand drop will be witnessed at line 234 which receives the signal, $E_y$. The resultant input to stage 231 represents a condition wherein the value $E_y$ is greater than the input from line 246 and the output of stage 231 at line 254 reflects this condition by assuming a zero logic level. Note, however, that the amount of demand drop must at least coincide with the fictitious load asserted at summing point 238 for the output of stage 231 at line 254 to transition. A zero logic level at line 254 permits the resetting of timing network 108 and the alteration of the output at line 268 of stage 232 to a zero logic level. The latter logic level at line 268 serves to turn off transistor Q1 to de-energize its associated relay and reconnect the load at least until the conclusion of the time-out of review timing network 144. Note that the reinsertion of the load with the turning off of transistor Q1 also shuts down network 102 to remove the fictitious load asserted at summing point 238. As is apparent, under the above circumstances, the lowest value load will be returned to activity within the system not withstanding priority.

It also will be apparent that controller modules as represented at FIG. 5 and earlier figures can be utilized alone without the review timing arrangement of FIG. 6. For example, should a load shedding function be desired for a single appliance such as a water heater, no review timing arrangement necessarily need be utilized and the more elaborate reviews may be dispensed with. The review interval timing function becomes valuable as the number of modular controllers increases for a given installation.

Since certain changes may be made in the above-described system, method and apparatus without departing from the scope of the invention herein involved, it is intended that all matter contained in the description thereof or shown in the accompanying drawings shall be interpreted as illustrative and not in a limiting sense.

We claim:

1. A system for selectively shedding electrical loads from a power input in accordance with a predetermined priority basis when the demand load value exhibited at said power input exceeds an allowable load vale, comprising:
   sensor means having an output signal, when activated, of instantaneous value corresponding with said demand load value;
   load control means for providing an allowable load signal of value corresponding with said allowable load value and
   a plurality of load switching units each connectable with a different load and each comprising a controller means and a switching means, each of said controller means having a receiving network, a priority delay network deriving an actuating output condition when enabled and following a priority interval selected in correspondence with the predetermined priority basis of its associated load, and actuator network means responsive to said actuating output condition for deriving a shedding signal, said receiving network having a first input for receiving said sensor means output signal and a second input for receiving said allowable load signal and deriving an output condition enabling said priority delay network when the signal value at said first input is greater than the signal value at said second input; and feedback circuit means responsive to said shedding signal for deriving a fictitious load signal of value substantially corresponding to its associated load and asserting said fictitious load signal at said receiving network first input of that controller means but not at the receiving network first input of any other controller means, and each of said switching means being connectable with its associated load and with said power output and responsive to said shedding signal supplied by its associated controller means for disconnecting its associated load from said power input.

2. The system of claim 1 further comprising reset control means including:
   input circuit means responsive to a said sensor means output signal representing a diminution of said demand load value for deriving a review actuating signal;
   review interval timing means actuable in response to said review actuating signal to derive a review interval timing signal at the termination of a predetermined review interval;
   condition responsive network means responsive to a said review actuating signal for deriving an enabling condition and responsive to said review interval timing signal in the presence of said enabling condition and a said review actuating signal for producing at an output thereof, a reset condition for effecting a re-evaluation of said demand load value in accordance with said controller means priority interval.

3. The system of claim 1 in which at least one of said feedback circuit means fictitious load signal is selected having a value corresponding to a load slightly above its associated load.

4. The system of claim 3 in which said fictitious load signal is selected having a value corresponding to a load of about one percent magnitude greater than said given load.

5. The system of claim 1 in which at least one of said feedback circuit means comprises:
   gate means responsive to said shedding signal for deriving an output; and
   voltage divider means including a variable impedance component manually adjustable to establish said ficitious load signal.

6. The system of claim 1 in which at least one of said controller means receiving network comprises:
   summing means having said first input for receiving said sensor means output signal at a summing point, said summing point being coupled with said feedback circuit means for receiving said fictitious load signal for providing a summation signal output; and
   first comparator means having a first input for receiving said summation signal output and having said controller means second input for receiving said allowable load signal and deriving said output condition enabling said priority delay network when the value of said summation signal output is greater than the signal value at said second input.

7. The system of claim 6 in which at least one of said priority delay network comprises an R-C network, the capacitor component of which is coupled with the output of said first comparator means in a manner effecting the discharge thereof in the absence of said enabling output condition, said R-C network deriving said actuating output condition following said priority interval in the presence of said enabling input condition.

8. The system of claim 7 in which at least one of said controller means actuator network means comprises second comparator means responsive to a predetermined reference signal and coupled with said R-C network for deriving said shedding signal.

9. The system of claim 1 in which at least one of said controller means further comprises regulator means for providing a filtered, regulated voltage supply to said receiving network, said priority delay network and said actuator network.

10. The system of claim 1 in which, in at least one of said controller means, said feedback circuit means comprises gate means responsive to said shedding signal for deriving an output, and voltage divider means including a variable impedance component manually adjustable to establish said fictitious load signal; and said controller means receiving network comprises summing means having said first input for receiving said sensor means output signal at a summing point, said summing point being coupled with said feedback circuit means for receiving said fictitious load signal for providing a summation signal output, and first comparator means having a first input for receiving said summation signal output and having said controller means second input for receiving said allowable load signal and deriving said output condition enabling said priority delay network when the value of said summation signal output is greater than the signal value at said second input.

11. The system of claim 10 in which each said associated controller means further comprises regulator means for providing a filtered regulated voltage supply to said receiving network, said priority delay network and said actuator network.

12. The system of claim 11 in which each said associated controller means further includes feedback circuit means responsive to said shedding signal for deriving a fictitious load signal of value substantially corresponding with said given load and asserting said fictitious load signal at said receiving network first input.

13. The system of claim 12 further comprising reset control means including:
input circuit means responsive to a said sensor means output signal representing a diminution of said demand load value for deriving a review actuating signal;
review interval timing means actuable in response to said review actuating signal to derive a review interval timing signal at the termination of a predetermined review interval;
condition responsive network means responsive to a said review actuating signal for deriving an enabling condition and responsive to said review interval timing signal in the presence of said enabling condition and a said review actuating signal for deriving at an output thereof, a transient reset condition for effecting a re-evaluation of said demand load value in accordance with said controller means priority interval.

14. The system of claim 13 in which said switching means includes an electromagnetically driven relay having normally closed contacts.

15. The system of claim 13 wherein said sensor means comprises:
an inductive sensing device positionable proximate said power input and having an a.c. output corresponding with said demand load value;
rectifier means for converting said a.c. output to a d.c. output;
first filter means having an output coupled with said controller means first input for treating said d.c. output to remove spurious noise therefrom; and
second filter means having an output coupled with said reset control means input circuit means for treating said d.c. output to emphasize the occurrence of a said diminution of said demand load value.

16. The system of claim 13 in which said reset control means condition responsive network means output is coupled with said sensor means, said transient reset condition effecting a corresponding transient removal of said sensor means output signal to reset said controller means and said reset control means.

17. The system of claim 1 in which at least one of said controller means is provided with manually-operable adjustment means for adjusting its priority interval.

18. The method for selectively shedding electrical loads from a power input in accordance with a predetermined priority basis comprising the steps of:
sensing the instantaneous demand load value exhibited at said power input and providing a demand load signal corresponding therewith;
comparing said demand load signal with a signal representing a predetermined allowable demand load value;
initiating time delay intervals with respect to each said load under a first condition where said demand load signal is greater than said allowable demand load value, each said delay interval associated with a said load having a duration directly related to the said priority basis of said load;
shedding each said load associated with a said time delay interval at the termination of a said interval in the continued presence of each first condition, and, simultaneously, summing a fictitious load signal corresponding with said shedded load with said demand load signal;
returning all said loads to said power input following an interval of predetermined duration and in the presence of a second condition wherein said demand load signal is of value less than the value of said allowable demand load signal.

* * * * *